(12) United States Patent
Gigliotti et al.

(10) Patent No.: US 9,538,319 B1
(45) Date of Patent: Jan. 3, 2017

(54) SYNCHRONIZATION FOR MAPPING APPLICATIONS

(75) Inventors: Samuel S. Gigliotti, Seattle, WA (US); Ronald A. Kornfeld, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/528,471

(22) Filed: Jun. 20, 2012

(51) Int. Cl.
*G06F 3/048* (2013.01)
*H04W 4/02* (2009.01)

(52) U.S. Cl.
CPC ..................................... *H04W 4/02* (2013.01)

(58) Field of Classification Search
CPC ...... H04L 67/18; H04W 4/02; H04M 1/72572
USPC ............................ 455/456.1, 456.6; 701/408
See application file for complete search history.

(56) References Cited

U.S. PATENT DOCUMENTS

| 8,180,379 B2* | 5/2012 | Forstall ................. G01C 21/12 455/41.2 |
| 8,326,858 B2* | 12/2012 | Jenson .............. G06F 17/30876 707/766 |
| 8,369,867 B2* | 2/2013 | Van Os ................... H04W 4/02 370/310.2 |
| 8,509,412 B2* | 8/2013 | Sheha .................... G01C 21/26 379/201.06 |
| 2005/0097005 A1 | 5/2005 | Fargo |
| 2008/0040678 A1 | 2/2008 | Crump |
| 2008/0070593 A1* | 3/2008 | Altman ................. H04L 63/102 455/457 |
| 2009/0005021 A1* | 1/2009 | Forstall ............. H04M 1/72572 455/414.3 |
| 2009/0005070 A1* | 1/2009 | Forstall et al. ............ 455/456.1 |
| 2009/0210148 A1* | 8/2009 | Jayanthi ................. G01C 21/26 701/467 |
| 2009/0293069 A1* | 11/2009 | Yang ......................... G06F 8/65 719/318 |
| 2009/0319181 A1 | 12/2009 | Khosravy et al. |
| 2011/0219105 A1* | 9/2011 | Kryze ..................... G06F 15/16 709/223 |
| 2011/0313657 A1 | 12/2011 | Myllymaki et al. |
| 2012/0143498 A1* | 6/2012 | Zubas .................... G01C 21/32 701/438 |

(Continued)

OTHER PUBLICATIONS

"MapQuest Enables Users to Send Maps and Directions to Cell Phones MapQuest", Mar. 26, 2007, Mapquest.com, pp. 1-2.*

(Continued)

*Primary Examiner* — Jeffrey A Gaffin
*Assistant Examiner* — Justin Lee
(74) *Attorney, Agent, or Firm* — Polsinelli LLP

(57) ABSTRACT

A user can access a mapping application from multiple devices, and updates made through one application can automatically be synchronized across the other devices. In some embodiments, a number of different activities of a user, such as entering an address or selecting a route, can cause information for that activity to be provided to a logically centralized system or service. The system or service then can notify the other devices of updated map state information for the user, which those devices can then request or download. The map information can include point of interest (POI) information from a number of sources, such as from a media information source that is able to provide POI information for locations associated with books, movies, music, and other types of media.

26 Claims, 6 Drawing Sheets

(56) References Cited

U.S. PATENT DOCUMENTS

2012/0295639 A1 11/2012 Fitoussi et al.
2015/0117796 A1 4/2015 Hile et al.

OTHER PUBLICATIONS

"Saving Custom Maps with My Maps", Jul. 3, 2010, Mapquest. com, pp. 1-3.*
"Non Final Office Action dated Jun. 5, 2013", U.S. Appl. No. 13/528,485, Jun. 5, 2013, 12 pages.
"Non-Final Office Action," mailed Jun. 5, 2013; in corresponding U.S. Appl. No. 13/528,485; 11 pages.
"Final Office Action," mailed Oct. 29, 2013; in corresponding U.S. Appl. No. 13/528,485; 14 pages.
"Non-Final Office Action," mailed Mar. 25, 2014; in corresponding U.S. Appl. No. 13/528,485; 12 pages.
Final Office Action dated Aug. 12, 2014; for U.S. Appl. No. 13/528,485 (11 pages).
Non Final Office Action dated Jan. 7, 2015; for U.S. Appl. No. 13/528,485 (12 pages).

* cited by examiner

SYNCHRONIZATION FOR MAPPING APPLICATIONS

BACKGROUND

Many people utilize computer-based mapping applications to obtain the locations of, and directions to, various locations, as well as to locate places near a current or specific location. A person wanting to perform such a task typically opens an application, inputs the necessary information (such as a location or point of interest) and receives location information, driving directions, nearby points of interest as determined by the mapping application provider, and other such information. If the user performs these operations on a device such as a home desktop computer, but wants the information available on the user's tablet computer or smart phone so the user has the information while the user is traveling, the user has to either capture and transfer at least some of the information, or has to open up a similar application on the tablet or phone and repeat at least a portion of the input or actions that enabled the user to obtain the desired mapping information. Such approaches can be frustrating, or at least time consuming, for a user. Further, the user might be interested in specific types of location or points of interest that the user would like to include with the mapping information, but the point of interest information provided with the mapping application typically is selected by a provider of the mapping application and often is limited to selected businesses, parks, and other such locations.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing mapping information to a user. In particular, various embodiments utilize a synchronization service (or system, etc.) that can be accessed by one or more computing devices associated with a user. When an event occurs with respect to a mapping application on one of those devices, such as a user submitting a new query, receiving driving directions, requesting a map, etc., information for that event can be transmitted to the synchronization service. The information can be sent after each such event, at regular intervals, or at other such times as discussed herein. When data is received to the synchronization service that differs from previously stored mapping data for that user, a notification can be sent to each other computing device associated with that user, through the synchronization service, that new information is available. The devices then can send a request for that information and, upon receiving the information, can store the information locally and associated with the mapping application. In other embodiments, the new information can be included directly in the notification. When the user subsequently opens the mapping application on that device, the user can pick up where the user left off, whether on that device or another device, or can otherwise obtain data that was determined or received on the other device.

The mapping data received by the computing devices can include points of interest (POI) that can be selected based on information for the user associated with those devices. For example, the mapping service might be associated with a media information service that can provide information about locations related to various media items, such as locations where movies were filmed, places songs were written about, etc. The media items can include, for example, movies, songs, books, and the like. In some embodiments, a mapping service can contact an electronic retailer or other such entity that has information regarding specific media items, or types of item, that the user has purchased, viewed, borrowed, downloaded, or otherwise shown interest in. The mapping service then can determine related POI data, such as by contacting the media information service, and provide that POI data to the devices as well. The POI can be provided at the time of a user request, in response to a synchronization event, or at any other appropriate time.

Various other uses, mechanisms, and approaches are discussed and suggested herein as are described with respect to the various embodiments.

Figure 1:
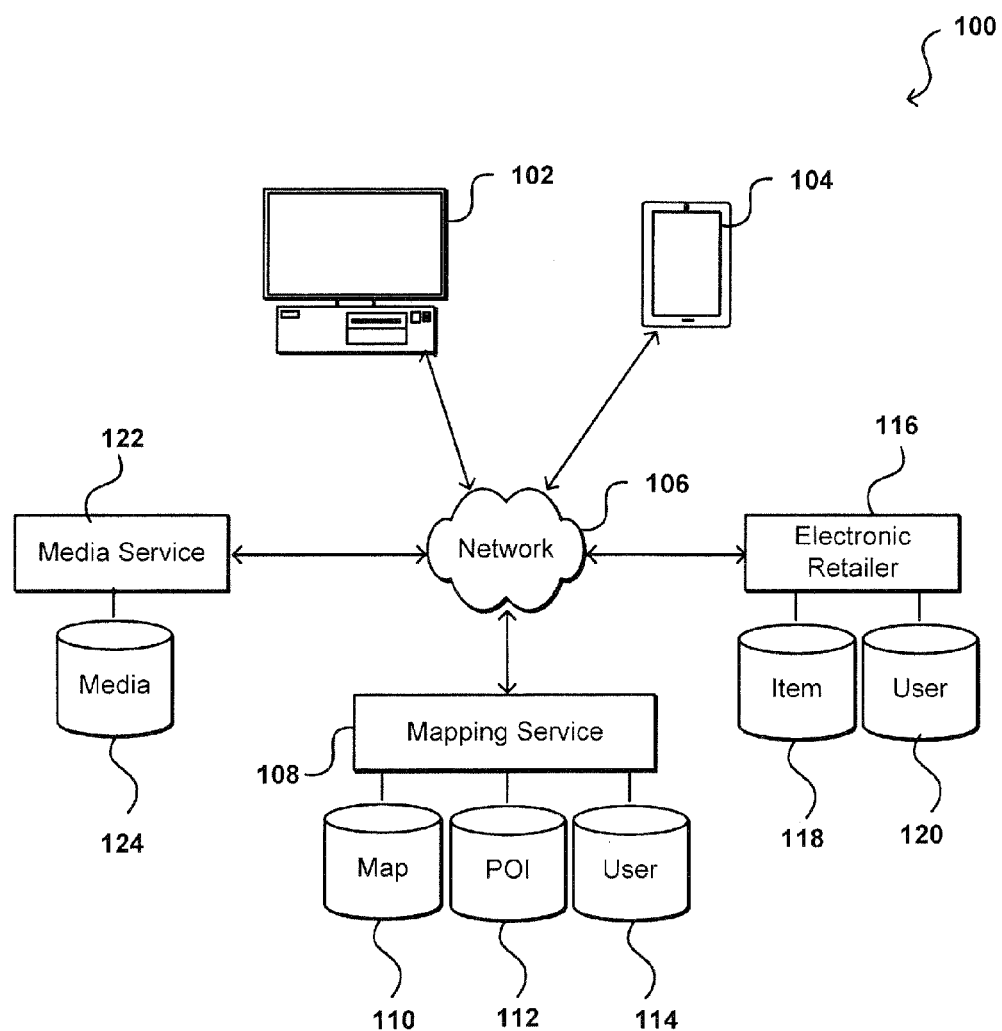
FIG. 1 illustrates an environment in which aspects of the various embodiments can be implemented.

FIG. 1 illustrates an example environment 100 in which a user can obtain mapping information across multiple devices, in accordance with various embodiments. It should be understood that the example system is a general overview of basic components, and that there can be many additional and/or alternative components utilized as known or used in the art for the generation, transmission, processing, management, and/or storage of electronic information. In this example, a user is able to utilize a client device 102, such as a personal computer, tablet computer, smart phone, and the like, to access a mapping system or service 108 over at least one appropriate network 106, such as a cellular network, the Internet, or another such network for communicating digital information. In some embodiments, a mapping application will be installed on the client device 102, such that much of the planning, information gathering, or other such aspects can be executed on the client device, while the mapping service 108 is contacted primarily to obtain graphical map tiles, point of interest data, and other such information, which the mapping service might pull from a map data store 110, a point of interest (POI) data store 112, and/or another such location. The determining of routes between two or more locations can be performed on the client device 102, by the mapping service 108, or a combination thereof. Various other interaction and execution approaches can be utilized as well within the scope of the various embodiments.

When a user of the client device 102 opens an application on the client device, the client device can contact the mapping service 108 to determine if any updated information is available. The mapping service can check data for that user, as may be stored in at least one user data store 114, and can provide any updated mapping information. This mapping information can include, for example, additional or updated POI, updated mapping data, and the like, and can also include information for any events that the user might have triggered through use of a second client device 104 associated with the user through the mapping service. Based at least in part upon this additional mapping information, as well as any mapping information previously stored on the computing device 102, the device can render an interface of the mapping application in a state corresponding to the state that was last accessed by the user on either of the computing devices 102, 104. The state rendered can provide the last view the user had when accessing the application on either device, or can be a main application screen that gives the user the option to obtain any previous information that is stored for the user. For example, if the user obtained directions to an address on a first device, that information might automatically be displayed on a second device when the user opens the mapping application. Alternatively, since the user might no longer be interested in those directions, the mapping application might instead supply a link, tab, or other way for the user to get back to those directions. Various other approaches to enabling the user to view this information can be utilized as well.

When the user performs certain actions with respect to the application on the client device 102, an event can be generated that can cause information to be synchronized between the client device and the user data store 114 of the mapping service 108. For example, a user might enter an address of interest, information for a point of interest, information for a desired route, a selection of a point of interest, or other such actions, which can cause an event to occur whereby the client device 102 can transmit corresponding data for the event to the mapping service 108. In this way, the current state of the application on the client device is stored locally to the mapping service 108, such that the application on the client device can replicate that state in case of a data loss or other such event.

Further, the updating of such information to the mapping service enables the state of the mapping application to also be replicated to at least one other client device 104 associated with the user. Although the client device 104 shown is a portable computing device, such as a tablet computer, smart phone, or personal data assistant, it should be understood that various types of client device can be used as well, as may include desktop computers, notebook computers, video game consoles, smart televisions, smart control devices, set-top boxes, and the like. Each time information for an event is received for the user to the mapping service, the mapping service can take one or more types of action to enable that information to be synchronized to the other devices as well, as may be configurable by the user. For example, in some embodiments the mapping service can be configured to "push" the data (at least the updated portion) to other devices associated with a user account maintained by the mapping service or an associated entity. In other embodiments, the mapping service can send a notification to each such device, whereby the devices can request the information at an appropriate time. In other embodiments, the mapping service might instead maintain a queue, log, list, or other set of change information for the user, and when the user accesses a related mapping application on one of the client devices, that client device can request any changes, updates, or other such information. Various other ways of synchronizing the devices can be used as well within the scope of the various embodiments.

Figure 2A:
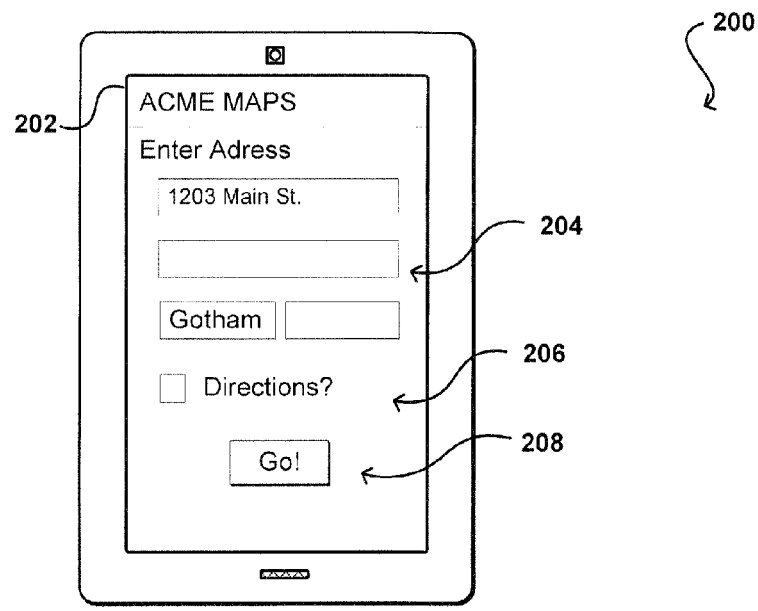
FIGS. 2(a), 2(b), and 2(c) illustrate an example interface displays that can be presented to a user in accordance with various embodiments.
Figures 2B, 2C:
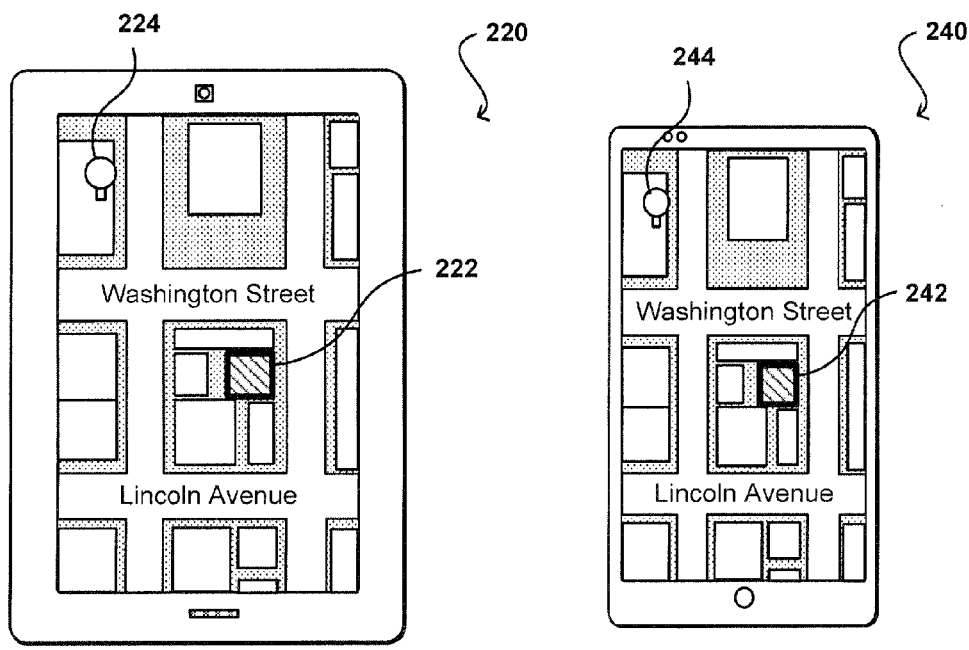

As an example, consider the situation of FIGS. 2(*a*), 2(*b*), and 2(*c*). In the interface state 200 of FIG. 2(*a*), a user has accessed a mapping application and entered an address 204 that the user would like to locate using the mapping application. Various other ways of obtaining information can be used as well, and options such as an element 206 enabling the user to obtain driving directions from a current, or specified, location can be used as well. In response to the user selecting an element 208 or option to perform the location, the device can determine mapping information for the location, either locally on the device or through a mapping service, or a combination thereof. In response the application on the client device can cause an interface state 220 to be displayed that includes a view of the specified address 222 as well as any surrounding roads, buildings, bridges, railways, and the like, at least within a specified zoom level or level of detail, among other such options. The view can also include one or more points of interest 224 that might be related to the address, specified by the mapping service, or otherwise selected for display to the user as discussed elsewhere herein.

In response to the user requesting information for the address and/or receiving the mapping data associated with that information, data for the change in state can be stored by the mapping service. If the information was located on the client device the information can be sent to the mapping service. If the client requested, and received, the information from the mapping service, the mapping service can cause data for that information to be stored to an appropriate data store. Various other alternatives or combinations can be used as well.

In the example state 240 of FIG. 2(*c*), the user has accessed a related mapping application on another computing device that is associated with the user. The device can be associated with the user by having information associated with the device stored with account information for the user with the mapping service, or using another such approach. When the updated data was stored to the mapping service, the mapping service could have notified the second device and/or sent the updated data, such that when the user accesses the mapping application on the second device the user can obtain the view in the example state 240 without having to reenter any information, perform similar requests, etc. As can be seen, the user can obtain the same, or a similar, map view, including information 242 for the address of interest, as well as the selected POI 244.

Figure 3:
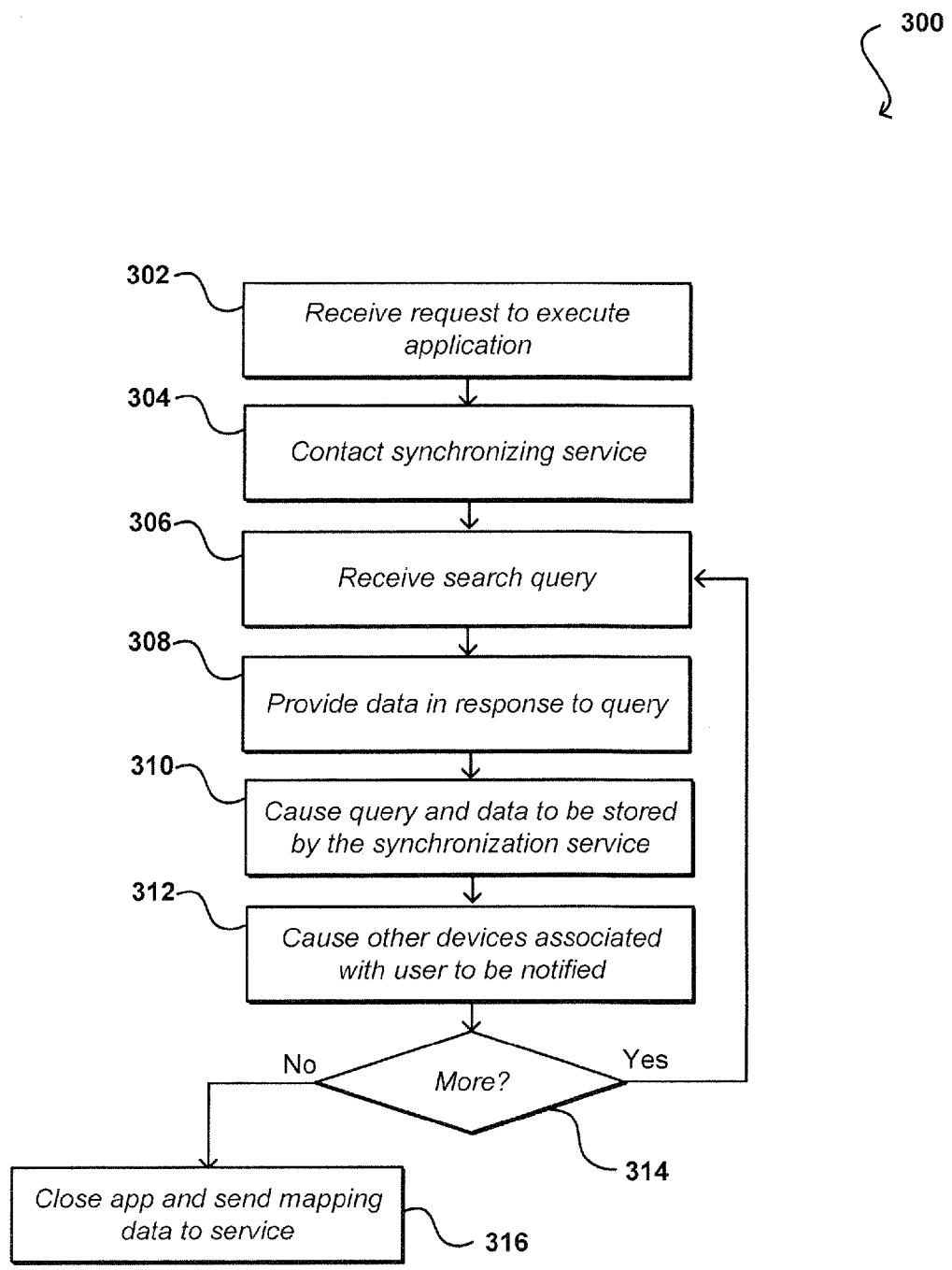
FIG. 3 illustrates an example process for synchronizing data across multiple devices that can be used in accordance with various embodiments.

FIG. 3 illustrates an example process 300 for synchronizing mapping data that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request to execute a mapping application is received 302 to a computing device. In addition to executing the application, the computing device can contact 304 a synchronizing service, which can be part of (or separate from) the mapping service in order to obtain any updated mapping data to the computing device or provide any updated mapping data from the computing device. As discussed, however, an application does not have to perform a synchronization operation at startup in at least certain embodiments. The computing device can then present the most recent mapping information to the user. The application can receive 306 a search query, or other indication or selection, from a user. As discussed, this can include a request for an address, a location of an address, a location of a point of interest, driving directions, and the like. In response, data for the query can be provided 308 to the user. Further, the query and/or response data can also be caused 310 to be stored by the synchronization and/or mapping service, whether by sending the data once determined, enabling the service to store data determined by a mapping service, or using another such approach. The storing of the updated data in this example can cause 312 a notification to be sent to any other devices associated with the user for purposes of the mapping application, such that the data is synchronized across those devices. If the user has more 314 actions to perform with response to the mapping application, the process can continue. Otherwise, if the user closes or otherwise quits using the mapping application on the computing device, the application can close and, in at least some embodiments, can send 316 information for the current mapping state to the synchronization service, such that the user can be sure to be able to resume the mapping state on the same or another device associated with the user.

In at least some embodiments, the information might not be fully synchronized across each device. For example, if a POI marker includes an animation on some devices, that marker might not also be synced to an e-book reader or other such device that might include an electrophoretic screen that does not have a sufficient refresh rate to display the animation. Similarly, a device might have little available memory, a small screen, or other aspects that might cause only a portion of the updated information, or a different version of some of the updated information, to be provided to that device. Similarly, a stationary device like a television might get static mapping information but not information that would assist a user in real time during the route, etc.

When determining the points of interest to provide to the user with the mapping data, a mapping service can use conventional POI determination approaches, such as to provide information about public locations (e.g., parks and government buildings) or major attractions (ball parks, amusement parks, etc.), as well as points of interest for businesses or locations with which the mapping service has established a business relationship, whether directly or indirectly. Referring back to FIG. 1, however, a mapping service 108 can be associated with at least one other entity that can assist in determining points of interest that might be relevant to the user. For example, in FIG. 1 the mapping service is shown to be able to communicate with an entity such as an electronic retailer 116. If a user of the mapping service also has an account (or the same account) with an electronic retailer, as might be stored in a user data store 120, the mapping service can contact the electronic retailer for information about the user (assuming the user approves, allows, or enables the transfer of such information). For example, the electronic retailer will typically store information about items (products, services, downloads, etc.) that the user has obtained, borrowed, viewed, or otherwise expressed interest. For items such as media items, there can be various locations associated with those media items. For example, if a user purchased a particular movie, there might be information available about where the movie supposedly took place, where certain scenes were shot, where props used in the movie are currently on display, etc. Similar information might be available for books, indicating where portions of the story took place, as well as where the author wrote the book or other such information. For music, information can include where a song was recorded, where the artist grew up, a location referenced in the lyrics, etc. Various other types of information can be available for media items as well within the scope of the various embodiments. The electronic retailer can determine the relevant data from at least one item data store 118, or other such location, to provide to the mapping service.

In the example situation of FIG. 1, the mapping service can obtain a list or set of information about media items associated with the user. This can include a list of specific items in which the user has expressed interest, types of items in which the user has expressed interest, related or recommended items, etc. In some cases, information obtained from the retailer might include data necessary to determine various POI that might be able to be provided to a user when the user views an area through the mapping application that is associated with that POI. In this example, the mapping service 108 is also associated with a media information service 122 that stores media information in at least one media data store 124, or other such location. If the mapping service received a list of media items in which the user is, or might be, interested, the mapping service can provide information for those media items to the media information service 122, which can provide information for locations related to those media items. In at least some embodiments, the media information provided can be geo-coded or otherwise can include location information that can enable that data to be easily ported into, or used by, the mapping service and/or mapping applications. In some cases the mapping service might contact the retailer and/or media service periodically to obtain such information, while in other embodiments the contact might be made in response to specific actions or events triggered by the user. In some embodiments, a request to the media service might include types of items as well as one or more geographic areas, such that the mapping service can obtain information that is relevant to the current view or state of the application for the user.

In some embodiments, the mapping service might include media related POI from the media information service, or another such source, independent of any actual user data from an electronic retailer or other such entity. For example, the mapping service might include the media-related information by default with certain areas. In other embodiments, a user might be able to select one or more types of POI to be displayed on a map area, and/or can choose not to display certain types of POI on the map. Various other options can be utilized as well.

Figure 4A:
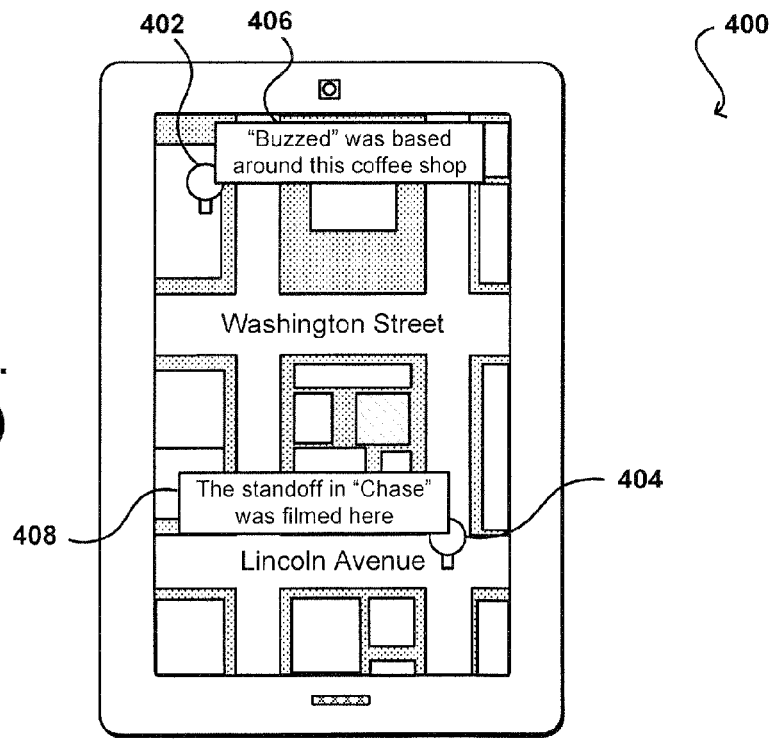
FIGS. 4(a) and 4(b) illustrate displays that can be presented to a user in accordance with various embodiments.

FIG. 4(*a*) illustrates a first example display 400 that can be provided to a user in accordance with various embodiments. In this example the user is viewing a region of an electronic map, displayed in response to a user requesting that view, navigating to that view, being in a location associated with that view, etc. The mapping service can have obtained item data for the user from an electronic retailer or marketplace, or could have received selection information from the user, etc., and have sent that information to a media information service, in order to obtain one or more POI that might be of interest to the user in that map region. In this example two POI 402, 404 are located and displayed. In this example, the POI are related to movies that the user has purchased. For each POI, information can be displayed (automatically or in response to a user action, for example) indicating what that location is or why it might be of interest to the user. For example, a first POI message 406 indicates that the coffee shop at that location was the basis for a movie the user purchased. A second POI message 408 indicated that an intersection was where a standoff scene in a particular movie was filmed. In this way, a user can obtain POI that are potentially of interest to the user based on information known about the user. The user in at least some embodiments can select to have this information shown, or to not have this information shown. Various other configuration options can be provided to the user as well.

Figure 4B:
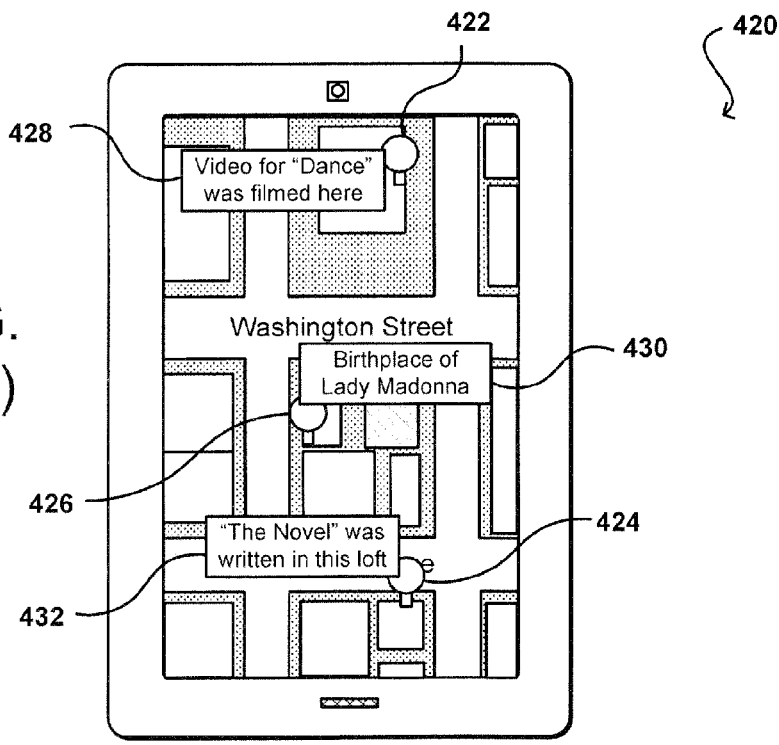

In the view 420 of FIG. 4(b), different POI are shown for a different user based at least in part a selection made by the user to receive specific types of media-related POI, types of POI provided by default, or using another such approach. In this example, there are three POI 422, 424, 426 located that each correspond to music or a book that might be of interest to the user. In this example, one POI message 428 indicates where a video for a specified song was shot, another message 430 indicates the birthplace of a musical artist, and another message 432 indicates a location of loft where a particular book was written. Various other types of information can be displayed as well within the scope of the various embodiments. As discussed above, this POI data can also be synchronized across devices using approaches such as those discussed and suggested herein.

Figure 5:
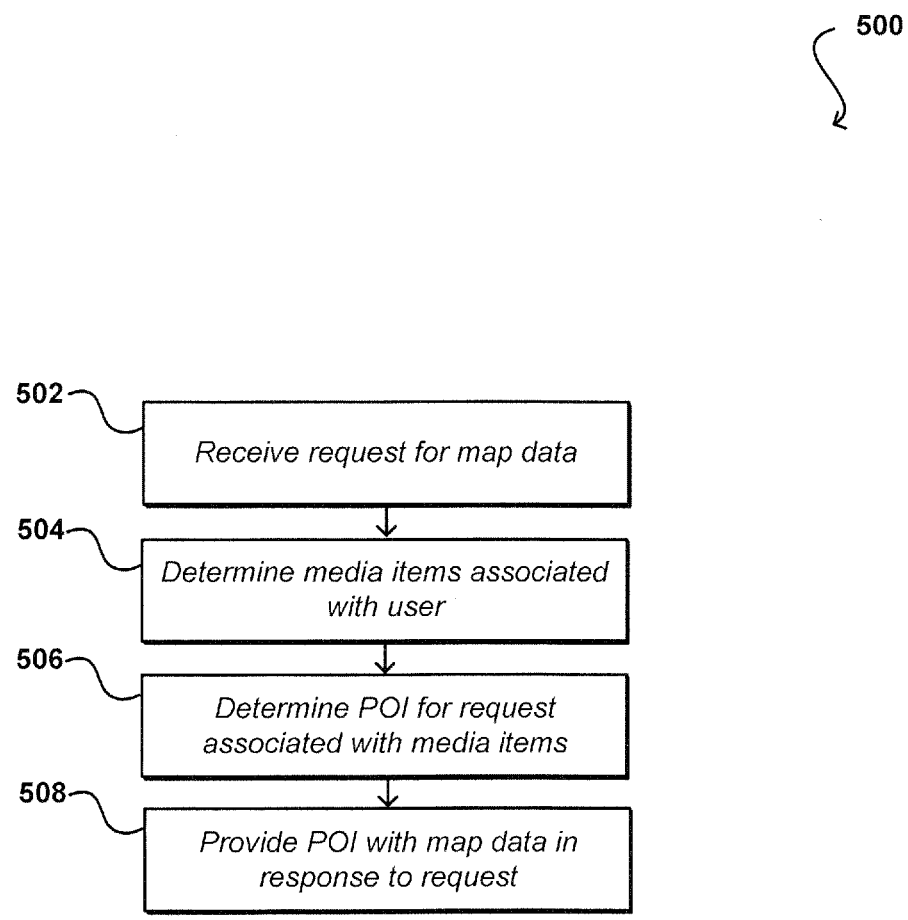
FIG. 5 illustrates an example process for locating POI related to media items that can be provided to a in accordance with various embodiments.

FIG. 5 illustrates an example process 500 for providing media POI that can be used in accordance with various embodiments. In this example, a request for map data is received 502 on behalf of a user. A mapping service can contact an appropriate entity, such as an electronic retailer, to determine 504 media items that are associated with the user, whether the user purchased the items, viewed the items, expressed interest in similar items, etc. Based at least in part upon the determined items and potentially a region of the map data, one or more POI can be determined 506 that are associated with those media items. Based on a number of allowable items, current view or zoom level, user permissions, or other such information, at least a portion of the located POI can be provided 508 with the map data for display to the user in response to the request.

As discussed, the media information can come from a media information provider or another such source. For example, a system or service might enable users to provide information they know about certain locations related to movies, music, etc. There might be a community rating service or other review process for the information, such that the validity or value of each entry can be determined through the community. For example, the entered data might be incorrect, or the location specified might now correspond to a vacant lot or department store that might not be worth a detour to see. In some cases, various tasks can be provided to users or other persons to provide specific information, such as where a film was shot, where a musician was born, etc. Various other approaches can be used as well within the scope of the various embodiments.

Figure 6:
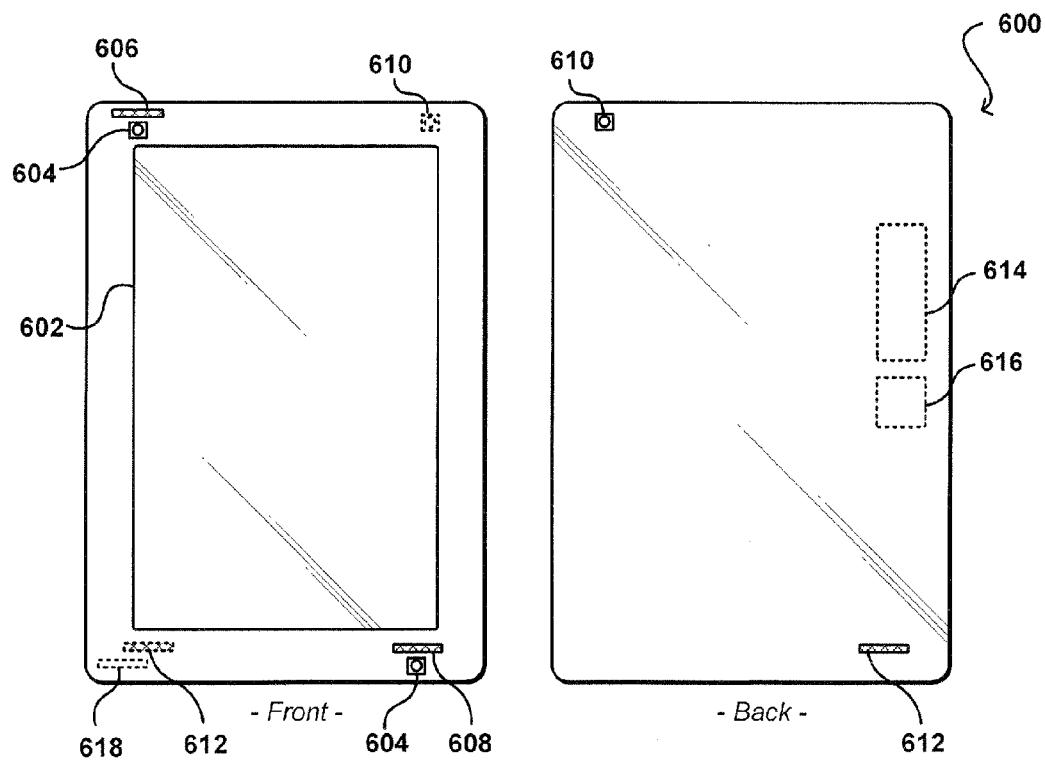
FIG. 6 illustrates an example device that can be used to enable a user to access and request mapping information in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
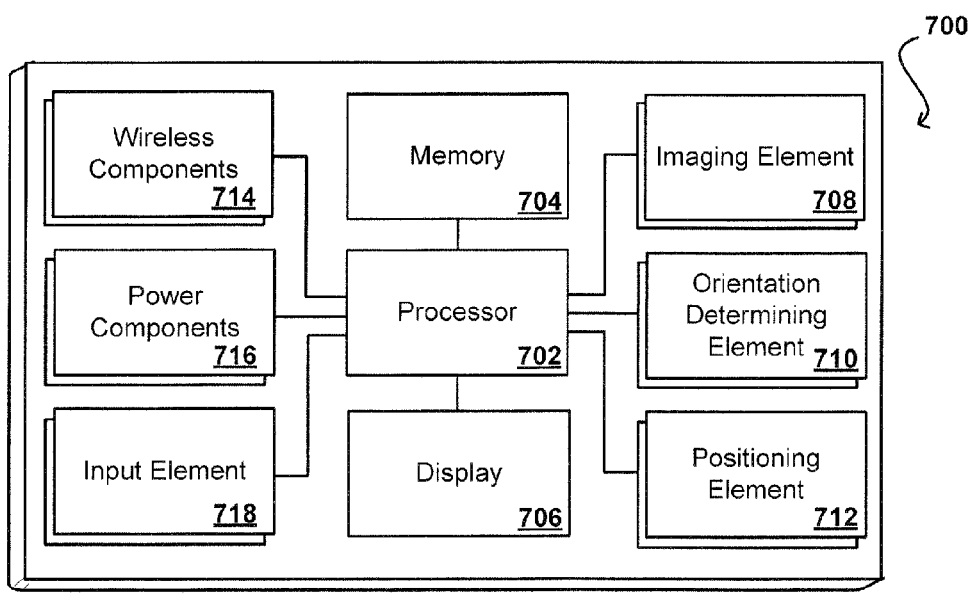
FIG. 7 illustrates example components of a device such as that illustrated in FIG. 6.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As discussed, different approaches can be implemented in various environments in accordance with the described embodiments. As will be appreciated, although a Web-based environment is used for purposes of explanation in at least some examples, different environments may be used, as appropriate, to implement various embodiments. A system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In an Internet-based example, the environment can include a Web server for receiving requests and serving content in response thereto, although for other networks, an alternative device serving a similar purpose could be used, as would be apparent to one of ordinary skill in the art.

An environment can also include at least one application server and at least one data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, depictions of systems discussed herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®. Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of synchronizing mapping information, comprising:
   receiving, by a mapping service, a first request for mapping information from a map application executing on a first client device;
   providing, by the mapping service, the mapping information to the first client device in response to the first request;
   determining media information corresponding to one or more media items associated with a user of the first client device;
   determining media location information corresponding to the one or more media items;
   providing to the first client device the media information and the media location information;
   receiving, by the mapping service, a communication from the first client device, the communication including at least information representing an interaction with the mapping information on the first client device, the interaction associated with a display view of the mapping information on the first client device;
   storing the information representing the interaction with the mapping information;
   receiving a second request by at least one second device, the second request enabling the at least one second device to display the mapping information, the information representing the interaction with the mapping information, the media information, and the media location information; and
   at substantially a same time, automatically sending to the at least one second device, by the mapping service, the mapping information, the information representing the interaction, the media information, and the media location information.

2. The computer-implemented method of claim 1, wherein the information representing the interaction with the mapping information on the first client device includes information specifying at least one of a route selected on the first client device, a point of interest selected on the first client device, an address entered on the first client device, a map query submitted on the first client device, a display location of a map, or a zoom level of a map display.

3. The computer-implemented method of claim 1, wherein the information representing the interaction with the mapping information is received in response to at least one of the first client device detecting the interaction, the mapping application being opened on the first client device, the mapping application being closed on the first client device, or a passage of a determined amount of time.

4. The computer-implemented method of claim 1, further comprising:
   receiving, by the mapping service, a second communication from the second device representing a second interaction with the mapping information; and
   sending, by the mapping service, a notification to the first client device regarding updated mapping information from the second communication.

5. The computer-implemented method of claim 1, wherein the mapping information includes at least one of a current view displayed by the map application, a current location specified by the map application, a route determined by the map application, or content displayed through the map application.

6. The computer-implemented method of claim 1, wherein the mapping information is sent by the mapping service to the at least one second device in order to synchronize the mapping information, corresponding to a view of the map application last displayed on the first client device, across the first client device and the at least one second device.

7. A computer-implemented method, comprising:
   receiving display view data, the display view data representing an interaction with mapping information associated with a mapping application on a first client device;
   receiving media information, the media information corresponding to one or more media items associated with a user of the first client device; and
   receiving media location information, the media location information corresponding to the one or media items;
   storing the display view data;
   storing the media information;
   storing the media location information; and
   at substantially a same time, automatically providing, by a mapping service, at least a portion of the display view data, the media information, and the media location information to at least one second client device.

8. The computer-implemented method of claim 7, wherein the at least a portion of the display view data is provided to the at least one second client device in order to synchronize the mapping information last displayed on the first client device across the first client device and the at least one second client device.

9. The computer-implemented method of claim 7, wherein the mapping information includes one or more points of interest (POI) obtained from a media information service corresponding to a portion of a map displayed through the mapping application.

10. The computer-implemented method of claim 9, wherein at least a portion of the one or more POI includes locations related to one or more media items.

11. The computer-implemented method of claim 10, wherein the media items include at least one of a book, a movie, a video game, or a music file.

12. The computer-implemented method of claim 7, further comprising:
determining the portion of the display view data to provide to a second client device of the at least one second client device based at least in part upon a characteristic of the at least one second client device.

13. The computer-implemented method of claim 7, wherein the display view data is provided in response to at least one of the first client device detecting an interaction with the mapping application, the mapping application being opened on the first client device, the mapping application being closed on the first client device, or a passage of a determined amount of time.

14. The computer-implemented method of claim 7, wherein the mapping information being provided to the at least one second client device is configured to display the mapping information displayed on the first client device.

15. The computer-implemented method of claim 7, wherein the display view data is capable of being provided to each of the at least one second client device.

16. The computer-implemented method of claim 7, wherein a copy of the display view data is stored by a mapping service remote to the first client device and the at least one second client device.

17. The computer-implemented method of claim 7, further comprising automatically sending a notification to at least one second client device, the notification indicating that the display view data has been stored, the notification including the display view data.

18. A computing system, comprising:
at least one processor; and
a memory device including instructions that, when executed by the at least one processor, cause the computing system to:
receive display view data representing an interaction with mapping information displayed by a mapping application on a first client device;
store the display view data;
receive media information, the media information corresponding to one or more media items associated with a user of the first client device;
store the media information;
receive media location information, the media location information corresponding to the one or more media items;
store the media location information;
determine one or more mapping information updates by comparing the stored display view data to data for past mapping information previously received from the first client device;
store data corresponding to the one or more mapping information updates; and
at substantially a same time, automatically send the media information, the media location information, and at least a portion of the data corresponding to the one or more mapping information updates to at least one second client device, the provided data corresponding to mapping information last displayed on the first client device.

19. The computing system of claim 18, wherein the past mapping information previously received with respect to the mapping application is received from the at least one second client device.

20. The computing system of claim 18, wherein different portions of the mapping information updates are provided to each of the at least one second client device based at least in part upon one or more aspects of the at least one second client device.

21. A non-transitory computer-readable storage medium storing instructions that, when executed by at least one processor of a computing system, enable the computing system to:
receive display view data, the display view data representing an interaction with mapping information associated with a mapping application on a first client device;
receive media information, the media information corresponding to one or more media items associated with a user of the first client device; and
receive media location information, the media location information corresponding to the one or media items;
store the display view data;
store the media information;
store the media location information; and
at substantially a same time, automatically provide, by a mapping service, at least a portion of the display view data, the media information, and the media location information to at least one second client device.

22. The non-transitory computer-readable storage medium of claim 21, wherein the instructions when executed further cause the computing system to:
determine the portion of the display view data to provide to a second client device of the at least one second client device based at least in part upon a characteristic of the at least one second client device.

23. The computer-implemented method of claim 7, wherein providing the at least a portion of the display view data to the at least one second client device enables the at least one second client device to display the mapping information last displayed on the first client device without reentry of information associated with the mapping information on the at least one second client device.

24. The computing system of claim 18, wherein providing the at least a portion of the display view data to the at least one second client device enables the at least one second client device to display the mapping information last displayed on the first client device without reentry of information associated with the mapping information on the at least one second client device.

25. The computer-implemented method of claim 10, wherein the one or more media items are available to purchase, to view, to borrow, or to download from an electronic retailer.

26. The computer-implemented method of claim 10, wherein the locations related to the one or more media items are related to the one or more media items by being referenced by the one or more media items, or by being associated with the creation of the one or more media items.

* * * * *